US011550961B1

(12) United States Patent
Horesh et al.

(10) Patent No.: US 11,550,961 B1
(45) Date of Patent: Jan. 10, 2023

(54) INTEGRITY PROTECTION FOR HOMOMORPHIC COMPUTATIONS

(71) Applicant: Intuit Inc., Mountain View, CA (US)

(72) Inventors: Yair Horesh, Kfar-Saba (IL); Margarita Vald, Tel Aviv (IL); Yaron Sheffer, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/730,424

(22) Filed: Apr. 27, 2022

(51) Int. Cl.
*G06F 21/64* (2013.01)
*G06N 20/00* (2019.01)
*H04L 9/00* (2022.01)

(52) U.S. Cl.
CPC .............. *G06F 21/64* (2013.01); *G06N 20/00* (2019.01); *H04L 9/008* (2013.01)

(58) Field of Classification Search
CPC .......... G06F 21/64; G06N 20/00; H04L 9/008
See application file for complete search history.

(56) References Cited

U.S. PATENT DOCUMENTS

| 2018/0286143 A1* | 10/2018 | Deshmukh | G07C 5/006 |
| 2018/0359078 A1* | 12/2018 | Jain | H04L 63/0428 |
| 2019/0342270 A1* | 11/2019 | Laine | G06F 21/602 |
| 2020/0136797 A1* | 4/2020 | Yu | H04L 9/008 |
| 2022/0166607 A1* | 5/2022 | Ratha | H04L 9/0825 |

* cited by examiner

Primary Examiner — Abiy Getachew
(74) Attorney, Agent, or Firm — Paradice & Li LLP

(57) ABSTRACT

Systems and methods for securely verifying integrity of application responses are disclosed. One example method includes receiving, from a client, an application encrypted in accordance with a fully homomorphic encryption (FHE) algorithm, generating, with a trained machine learning model associated with the FHE algorithm, a plurality of first application labels, each first application label indicating a true or false response associated with the application, inverting a randomly selected portion of the plurality of first application labels, generating a first randomly sorted list including the plurality of first application labels, transmitting the first randomly sorted list to the client, receiving a first decrypted list from the client, performing a validation of at least the first decrypted list, the validation based at least in part on the plurality of first application labels, and in response to the validation being successful, providing the client with a response to the application.

20 Claims, 4 Drawing Sheets

INTEGRITY PROTECTION FOR HOMOMORPHIC COMPUTATIONS

TECHNICAL FIELD

This disclosure relates generally to methods for operating trained machine learning models, and specifically to the secure verification of the integrity of results generated by such models in environments of mutual distrust.

DESCRIPTION OF RELATED ART

Individuals or businesses may apply for admission, approval, or other benefits in a variety of contexts, and the submission of sensitive data may often be required in connection with such applications. For example, the sensitive data and related documentation may be submitted to a data processor which may generate one or more positive or a negative responses, either accepting or declining one or more aspects of the application. For example, individuals or businesses may apply for approval or admission relating to admittance to one or more academic or professional programs, approval of governmental benefits such as unemployment, eligibility for one or more employment or fellowship opportunities, loan applications, mortgage applications, and so on. However, such data may include sensitive personal or business information, which the individuals or businesses may be reluctant to provide to a third party unencrypted. Additionally, the data processor may distrust the individuals or businesses, and may desire verification that the generated response has not been altered or otherwise tampered with.

Accordingly, there is a need for securely verifying response integrity, protecting the sensitive information associated with the individuals or businesses, while ensuring that the individuals or businesses have not tampered with or otherwise altered a generated response.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for securely verifying the integrity of application responses. An example method may be performed by one or more processors of a computing device and include receiving, from a client, an application encrypted in accordance with a fully homomorphic encryption (FHE) algorithm, generating, with a trained machine learning model associated with the FHE algorithm, a plurality of first application labels, each first application label indicating a true or false response associated with the received application, inverting a randomly selected portion of the plurality of first application labels, generating a first randomly sorted list including the plurality of first application labels, transmitting the first randomly sorted list to the client, receiving a first decrypted randomly sorted list from the client, performing a validation of at least the first decrypted randomly sorted list, the validation based at least in part on the plurality of first application labels, and in response to the validation being successful, providing the client with a response to the application.

In some implementations, the first randomly sorted list further includes the plurality of first padding bits, and the validation is further based on the plurality of first padding bits. In some aspects, a number of first application labels in the plurality of first application labels equals a number of first padding labels in the plurality of first padding labels. In some aspects, the plurality of first application labels includes an integer power of two first application labels and the plurality of first padding labels each include the integer power of two first padding labels.

In some implementations, inverting the randomly selected portion of the plurality of first application labels includes inverting randomly inverting first application labels such that each application label of the plurality of first application labels has a 50% chance to be inverted.

In some implementations, performing the validation of the first decrypted randomly sorted list includes verifying that all first application labels are true or that all first application labels are false. In some aspects, performing the validation of the first decrypted randomly sorted list includes verifying that each first padding label has an index and a value in correspondence with the randomly sorted list.

In some implementations, the trained machine learning model includes one of a decision tree, a random forest, or a logistic regression model.

In some aspects, the method further includes generating, with the trained machine learning model associated with the FHE algorithm, a plurality of second application labels, each second application label indicating a true or false response associated with the received application, inverting a randomly selected portion of the plurality of second application labels, randomly generating a plurality of second padding labels, generating a second randomly sorted list including the plurality of second application labels and the plurality of second padding labels, transmitting the second randomly sorted list to the client, and receiving a second decrypted randomly sorted list from the client, wherein the validation further validates the second decrypted randomly sorted list, wherein the validation is further based at least in part on the plurality of second application labels and the plurality of second padding labels.

Another innovative aspect of the subject matter described in this disclosure can be implemented as a system for securely verifying the integrity of application responses. An example system includes one or more processors, and a memory storing instructions for execution by the one or more processors. Execution of the instructions causes the system to perform operations including receiving, from a client, an application encrypted in accordance with a fully homomorphic encryption (FHE) algorithm, generating, with a trained machine learning model associated with the FHE algorithm, a plurality of first application labels, each first application label indicating a true or false response associated with the received application, inverting a randomly selected portion of the plurality of first application labels, generating a first randomly sorted list including the plurality of first application labels, transmitting the first randomly sorted list to the client, receiving a first decrypted randomly sorted list from the client, performing a validation of at least the first decrypted randomly sorted list, the validation based at least in part on the plurality of first application labels, and in response to the validation being successful, providing the client with a response to the application.

In some implementations, the first randomly sorted list further includes the plurality of first padding bits, and the validation is further based on the plurality of first padding bits. In some aspects, a number of first application labels in the plurality of first application labels equals a number of first padding labels in the plurality of first padding labels. In some aspects, the plurality of first application labels includes an integer power of two first application labels and the plurality of first padding labels each include the integer power of two first padding labels.

In some implementations, inverting the randomly selected portion of the plurality of first application labels includes inverting randomly inverting first application labels such that each application label of the plurality of first application labels has a 50% chance to be inverted.

In some implementations, performing the validation of the first decrypted randomly sorted list includes verifying that all first application labels are true or that all first application labels are false. In some aspects, performing the validation of the first decrypted randomly sorted list includes verifying that each first padding label has an index and a value in correspondence with the randomly sorted list.

In some implementations, the trained machine learning model includes one of a decision tree, a random forest, or a logistic regression model.

In some aspects, the operations further include generating, with the trained machine learning model associated with the FHE algorithm, a plurality of second application labels, each second application label indicating a true or false response associated with the received application, inverting a randomly selected portion of the plurality of second application labels, randomly generating a plurality of second padding labels, generating a second randomly sorted list including the plurality of second application labels and the plurality of second padding labels, transmitting the second randomly sorted list to the client, requesting the client decrypt the second randomly sorted list in accordance with the FHE algorithm, and receiving a second decrypted randomly sorted list from the client, wherein the validation further validates the second decrypted randomly sorted list, wherein the validation is further based at least in part on the plurality of second application labels and the plurality of second padding labels.

Another innovative aspect of the subject matter described in this disclosure can be implemented as a non-transitory computer-readable storage medium storing instructions for execution by one or more processors of a system. Execution of the instructions by the one or more processors causes the system to perform operations including receiving, from a user, an application encrypted in accordance with a fully homomorphic encryption (FHE) algorithm, generating, with a trained machine learning model associated with the FHE algorithm, a plurality of first application labels, each first application label indicating a true or false response associated with the received application, inverting a randomly selected portion of the plurality of first application labels, generating a first randomly sorted list including the plurality of first application labels, providing the first randomly sorted list to the user, requesting the user decrypt the first randomly sorted list in accordance with the FHE algorithm, receiving a first decrypted randomly sorted list from the user, performing a validation of at least the first decrypted randomly sorted list, the validation based at least in part on the plurality of first application labels and the plurality of first padding labels, and in response to the validation being successful, providing the user with a response to the application.

In some implementations, the first randomly sorted list further includes the plurality of first padding bits, and the validation is further based on the plurality of first padding bits. In some aspects, a number of first application labels in the plurality of first application labels equals a number of first padding labels in the plurality of first padding labels. In some aspects, the plurality of first application labels includes an integer power of two first application labels and the plurality of first padding labels each include the integer power of two first padding labels.

In some implementations, inverting the randomly selected portion of the plurality of first application labels includes inverting randomly inverting first application labels such that each application label of the plurality of first application labels has a 50% chance to be inverted.

In some implementations, performing the validation of the first decrypted randomly sorted list includes verifying that all first application labels are true or that all first application labels are false. In some aspects, performing the validation of the first decrypted randomly sorted list includes verifying that each first padding label has an index and a value in correspondence with the randomly sorted list.

In some implementations, the trained machine learning model includes one of a decision tree, a random forest, or a logistic regression model.

In some aspects, the operations further include generating, with the trained machine learning model associated with the FHE algorithm, a plurality of second application labels, each second application label indicating a true or false response associated with the received application, inverting a randomly selected portion of the plurality of second application labels, randomly generating a plurality of second padding labels, generating a second randomly sorted list including the plurality of second application labels and the plurality of second padding labels, providing the second randomly sorted list to the user, requesting the user decrypt the second randomly sorted list in accordance with the FHE algorithm, and receiving a second decrypted randomly sorted list from the user, wherein the validation further validates the second decrypted randomly sorted list, wherein the validation is further based at least in part on the plurality of second application labels and the plurality of second padding labels.

Another innovative aspect of the subject matter described in this disclosure can be implemented as a method for securely verifying the integrity of application responses. An example method may be performed by one or more processors of a computing device and include receiving, from a client, an application encrypted in accordance with a fully homomorphic encryption (FHE) algorithm, generating, with a trained machine learning model associated with the FHE algorithm, a plurality of responses to the received application, where each response to the received application includes a first application label and a second application label, inverting a randomly selected portion of the plurality of first application labels and the plurality of second application labels, randomly generating a plurality of first padding labels and a plurality of second padding labels, generating a first randomly sorted list including the plurality of first application labels and the plurality of first padding labels, generating a second randomly sorted list including the plurality of second application labels and the plurality of second padding labels, transmitting the first randomly sorted list and the second randomly sorted list to the client, receiving a first decrypted randomly sorted list and a second decrypted randomly sorted list from the client, performing a validation of at least the first decrypted randomly sorted list and the second decrypted randomly sorted list, the validation based at least in part on the plurality of first application labels, the plurality of first padding labels, the plurality of second application labels, and the plurality of second padding labels, and providing the client with a response to the application in response to the validation of the first decrypted randomly sorted list and the second decrypted randomly sorted list being successful.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Figure 1:
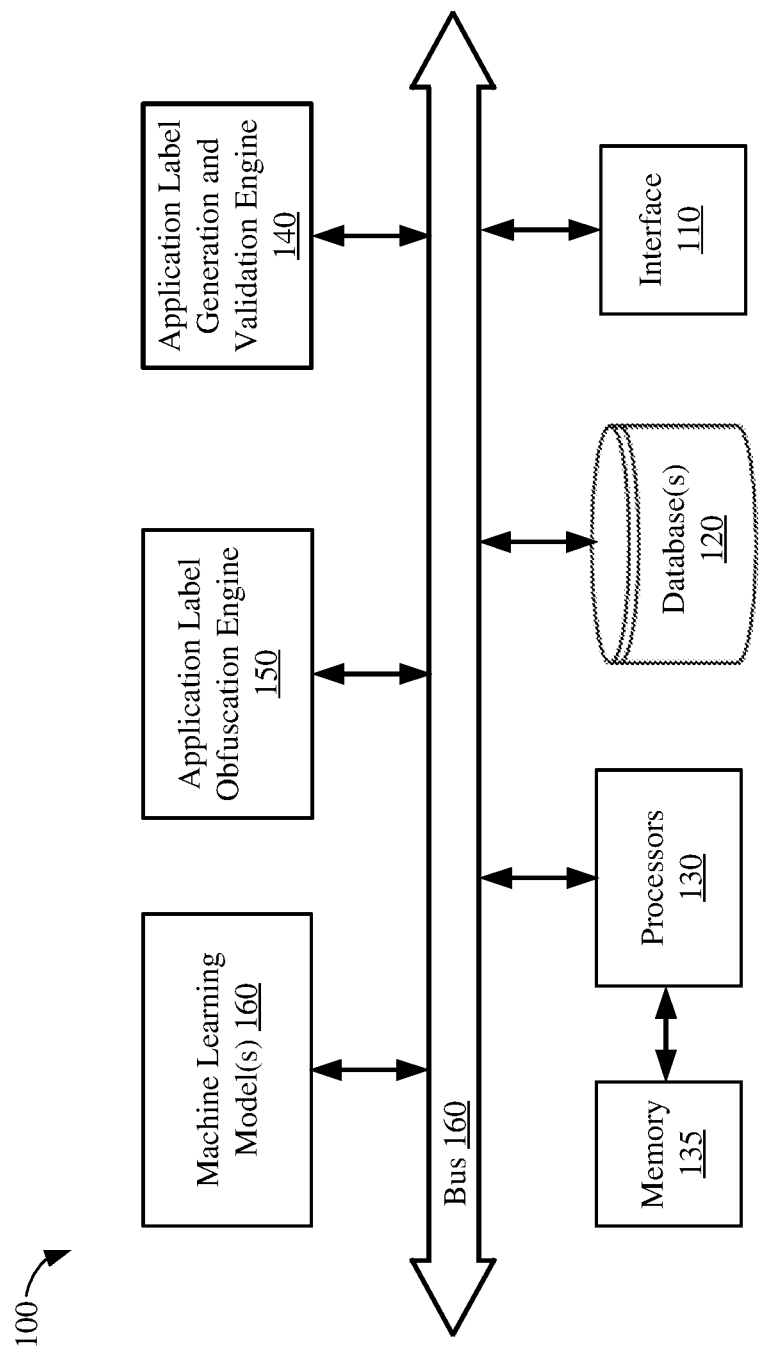
FIG. 1 shows an example secure application validation system, according to some implementations.

Implementations of the subject matter described in this disclosure may be used to securely validate the integrity of responses to applications generated using machine learning models. More particularly, the example implementations may provide responses to submitted applications without disclosing an applicant's personal information and while ensuring that the applicant has not tampered with the application response. For example, a data processor may need to provide a response to the application, but the applicant may be unwilling to disclose sensitive personal information to the data processor, for reasons related to security, business constraints, legal constraints, compliance constraints, and so on. Similarly, the data processor may not trust the applicant not to tamper with application results. That is, the application may be submitted in an environment of mutual distrust. The example implementations may provide such secure validation by enabling the applicant to submit the application encrypted using a fully homomorphic encryption (FHE) algorithm. The data processor may then generate the application response using a machine learning model adapted for use with the same FHE algorithm. The data processor may then provide obfuscated application results for decryption by the user using the FHE algorithm. After the user provided the decrypted obfuscated application results to the data processor, the data processor may validate that the user has not tampered with them. If this validation is successful, the data processor may provide unobfuscated application results to the user. Such processes may enable the protection of the user's sensitive information, while enabling the data processor to verify the integrity of any application responses provided to the user.

Various implementations of the subject matter disclosed herein provide one or more technical solutions to the technical problem of securely verifying the integrity of results to applications submitted by users or other clients. More specifically, various aspects of the present disclosure provide a unique computing solution to a unique computing problem that did not exist prior to electronic or online application submission systems that can allow clients to submit applications based on potentially sensitive personal information. As such, implementations of the subject matter disclosed herein are not an abstract idea such as organizing human activity or a mental process that can be performed in the human mind. For example, the human mind is not practically capable of generating application responses using machine learning models, or of encrypting or decrypting information according to FHE algorithms.

Moreover, various aspects of the present disclosure effect an improvement in the technical field of protecting the integrity of securely submitted applications. The use of fully homomorphic encryption to enable the generation of application responses without disclosing the sensitive personal information contained in such applications, and the integrity validation of these generated application responses via the applicant's decryption of obfuscated application responses, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice. For example, the example implementations may be used in association with a variety of typed of applications which are unrelated to economic matters.

FIG. 1 shows an example secure application validation system 100, according to some implementations. Although described herein with respect to securely validating the integrity of responses to submitted applications, various aspects of the secure application validation system 100 disclosed herein may be applicable for securely verifying the integrity of the results of any computations to be performed on sensitive information, such as sensitive personal or corporate information.

The secure application validation system 100 is shown to include an input/output (I/O) interface 110, one or more database(s) 120, one or more data processors 130, a memory 135 coupled to the data processors 130, a label generation and validation engine 140, an application label obfuscation engine 150, and one or more machine learning models 160. In some implementations, the various components of the secure application validation system 100 may be interconnected by at least a data bus 160, as depicted in the example of FIG. 1. In other implementations, the various components of the secure application validation system 100 may be interconnected using other suitable signal routing resources.

The interface 110 may include a screen, an input device, one or more network interfaces, and other suitable elements that allow information to be provided to the secure application validation system 100 and/or to retrieve information from the secure application validation system 100. Example information that can be provided to the secure application validation system 100 may include encrypted applications, one or more trained machine learning models, configuration information for one or more fully homomorphic encryption (FHE) algorithms, configuration information for obfuscating generated application labels, and the like. Example information that can be retrieved from the secure application validation system 100 may include application responses, validation results, machine learning model parameters, and the like.

The database 120, which may represent any suitable number of databases, may store any suitable information pertaining to FHE protocols, machine learning model training sets, and so on. For example, the information may include training data for training the machine learning models 160, may include encryption configuration information associated with the FHE algorithms for use with the secure application validation system 100, may include information specifying which FHE algorithm is to be used in connection with received applications, may include user/client information (such as phone numbers, email addresses, physical mailing address, SSNs, and so on), and so on. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the secure application validation system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The application label generation and validation engine 140 may be used for generating encrypted application labels associated with encrypted applications received from users of the secure application validation system 100, for example using the machine learning models 160, and may perform validation of decrypted obfuscated application labels received from those users. More particularly, the received applications may be encrypted according to a FHE algorithm, and the machine learning models may generate the encrypted application labels based on the FHE algorithm. Additionally, for each submitted application, a plurality of application labels may be generated based on the FHE algorithm and may be used for generating the obfuscated application labels with the application label obfuscation engine 150. Validation of decrypted obfuscated application labels received from the users may be performed based on obfuscation performed by the application label obfuscation engine 150. In response to successful validation, the users may be provided with unobfuscated responses to their submitted applications.

The application label obfuscation engine 150 may operate on encrypted application labels generated by the application label generation and validation engine 140 in order to generate obfuscated application labels for the users to decrypt and return for validation. More particularly, such obfuscation may include randomly inverting a portion of a plurality of application labels generated by the application label generation and validation engine 140. For example, in some implementations, each application label may have a one half, or 50%, chance to be inverted. Additionally, in some implementations, a plurality of padding labels may be randomly generated by the application label obfuscation engine 150. An obfuscated list of labels may be generated to include a randomly sorted list of labels including the plurality of application labels (including the inverted application labels) as well as the plurality of padding labels. Thus, when the randomly sorted list is provided to a user, the user has no knowledge whether any particular label is an uninverted application label or if it is an inverted application label. If padding labels are included in the randomly sorted list, then the user is additionally unaware of whether any label is an application label at all. Thus, the user is highly unlikely able to tamper with the application labels of the randomly sorted list without the secure application validation system 100 identifying such tampering.

The machine learning models 160 may store any number of machine learning models that can be used to generate encrypted application labels based on encrypted applications received from users of the secure application validation system 100. For example, for some applications, the machine learning models 160 may generate a binary application label indicating approval or rejection of the application, while in some other implementations the generated application labels may include a plurality of bits, for example indicating a score associated with a received application. The machine learning models 160 may be configured to operate on applications encrypted in accordance with one or more FHE algorithms, and to generate encrypted application labels in accordance with the one or more FHE algorithms. A machine learning model can take the form of an extensible data structure that can be used to represent sets of words or phrases and/or can be used to represent sets of attributes or features. The machine learning models may be seeded with training data for determining a response to a received application, such as an approval or denial response, in the case of purely binary application responses, or a score, in the case of application responses including a plurality of bits. The machine learning models 160 may include one or more decision tree models, one or more random forest models, one or more logistic regression based models, or any other suitable machine learning models capable of operating on data encrypted according to FHE algorithms.

The particular architecture of the secure application validation system 100 shown in FIG. 1 is but one example of a variety of different architectures within which aspects of the present disclosure may be implemented. For example, in other implementations, the secure application validation system 100 may not include an application label generation and validation engine 140, the functions of which may be implemented by the data processors 130 executing corresponding instructions or scripts stored in the memory 135. Similarly, the functions of the application label obfuscation engine 150 may be performed by the data processors 130 executing corresponding instructions or scripts stored in the memory 135. Similarly, the functions of the machine learning models 160 may be performed by the data processors 130 executing corresponding instructions or scripts stored in the memory 135.

Figure 2:
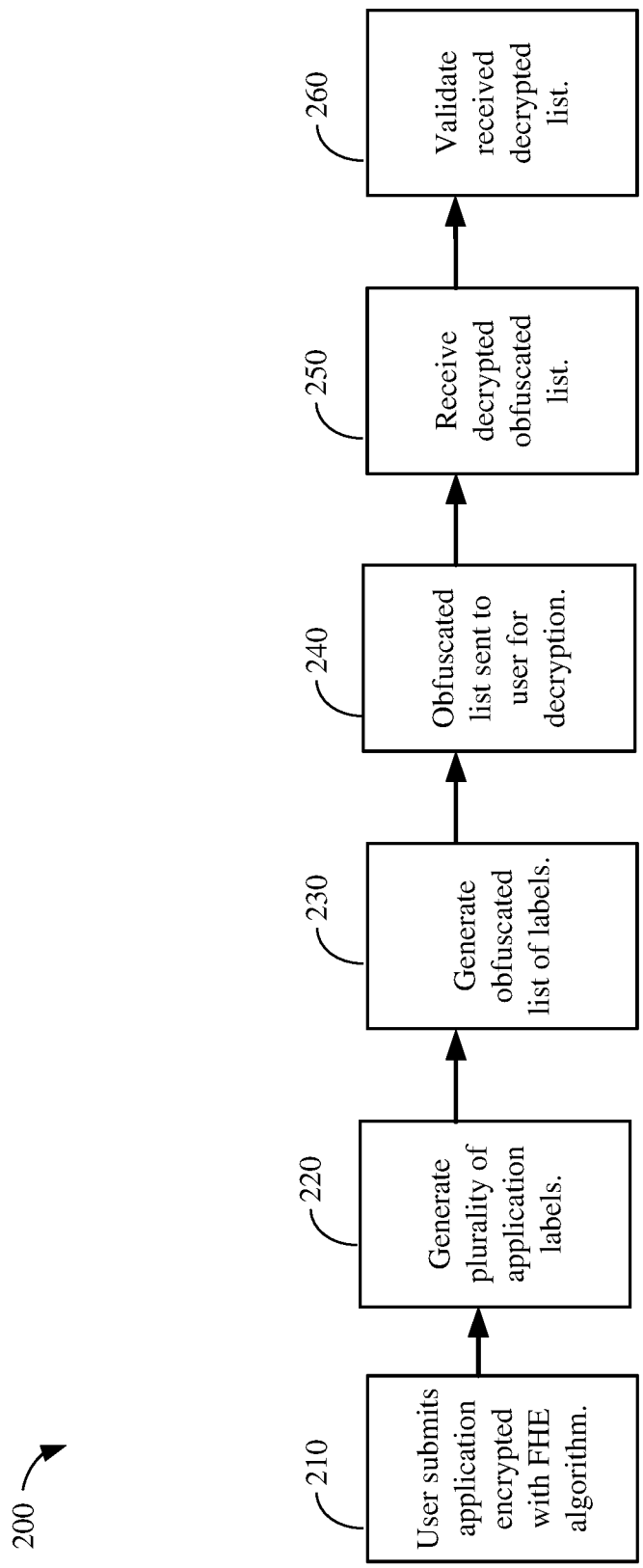
FIG. 2 shows a high-level overview of an example process flow that may be employed by the secure application validation system of FIG. 1.

FIG. 2 shows a high-level overview of an example process flow 200 that may be employed by the secure application validation system 100 of FIG. 1. At block 210, a user submits an application to the secure application validation system 100. The application may be encrypted in accordance with a fully homomorphic encryption (FHE) algorithm. In block 220, the secure application validation system 100 generates a plurality of application labels based on the encrypted application submitted by the user. Each application label may indicate a true or false response associated with the application. For example, the plurality of application labels may be generated by the application label generation and validation engine 140 using the machine learning models 160 which have been trained to operate on applications encrypted according to the FHE algorithm. At block 230, the secure application validation system 100 may generate an obfuscated list of labels based on the plurality of application labels. For example, the obfuscated list of labels may be generated by the application label obfuscation engine 150. In some aspects, the obfuscated list of labels may include the plurality of application labels, a portion of which have been inverted. In some implementations the obfuscated list of labels may further include a plurality of randomly generated padding labels which may be randomly inserted amidst the plurality of application labels. At block 240, the obfuscated list of labels may be sent to the user for decryption in accordance with the FHE algorithm. At block 250, the secure application validation system 100 may receive the decrypted list of labels from the user. At block 260, the secure application validation system 100 may validate the integrity of the received decrypted list of labels. For example, the validation may be performed by the application label generation and validation engine 140. In some aspects, validating the decrypted list of labels may include inverting labels of the decrypted list of labels corresponding to application labels which were inverted at block 230. After inverting these labels, validating the decrypted list of labels may include verifying that all application labels in the decrypted list of labels have the same value, such as True or False. If padding labels were included in the obfuscated list of labels at block 230, validating the decrypted list of labels may include verifying that the indices and/or values of the padding labels were preserved in the decrypted list of labels as generated. While not shown in process flow 200 for simplicity, in some aspects, in response to successful validation of the decrypted list, the user may be provided with a response to their submitted application.

As discussed above, clients may wish to submit applications for approval or scoring in a variety of contexts. Example applications may relate to applications for admissions or acceptance to academic or professional programs, applications for employment or fellowship opportunities, loan applications, mortgage applications, applications relating to eligibility for various governmental or nongovernmental programs, and so on. Such applications may frequently include sensitive personal or other information, and the clients may wish to protect that sensitive information when submitting an application. Additionally, data processors receiving the applications may desire to verify that clients have not tampered with application responses, such as acceptance or denials relating to the submitted applications. The data processors may therefore wish to validate the integrity of the application responses, verifying that such tampering has not taken place. The applications may thus be considered to be submitted in an environment of mutual distrust. Accordingly, it would be desirable to securely provide responses to submitted applications while verifying the integrity of such responses, to both protect the sensitive information and verify a lack of tampering with application responses.

Accordingly, the example implementations allow for responses to submitted encrypted applications to be securely provided and validated. More particularly, example implementations may allow trained machine learning models to operate on encrypted applications in accordance with a fully homomorphic encryption (FHE) protocol, and for responses to such applications to be securely validated, by replicating and obfuscating generated application labels, and validating the application response based on the client submitting the application decrypting and returning the obfuscated application labels. The machine learning models' operating on the encrypted applications using FHE may enable sensitive information to remain secure, protecting such sensitive information from disclosure to the data processor generating the application response, while the validation of the decrypted obfuscated application labels may allow the data processor to ensure the client has not tampered with the application response. Thus, the example implementations may protect the sensitive contents of the applications submitted to the data processor, while also validating the integrity of the application processing.

As discussed above, a client may submit an application encrypted with an FHE algorithm to a data processor in order for the data processor to generate a response to the application, such as an acceptance or denial of the application, a scoring of the application, and so on. In some implementations, the data processor may be the secure application validation system 100 of FIG. 1 and may perform the process flow 200 of FIG. 2. The data processor may process the encrypted application using a trained machine learning model configured to generate responses to applications of the type submitted by the client. For example, the machine learning model may be configured to generate an acceptance or a denial of an application having a binary response, such as an application for admission to a program, an application querying eligibility for a program, a loan application, and so on. The trained machine learning model may be configured to operate on data encrypted according to the FHE algorithm.

Because the data processor does not trust the client not to manipulate or otherwise alter the application results, example implementations provide for validation of the integrity of the application response before the client is provided with the application response.

Rather than simply generating a single copy of the application label comprising the application response, each application label may be replicated a plurality of times according to the FHE algorithm, resulting in generation of a plurality of application labels. Note that the FHE algorithm may produce different encryption of the same underlying application label when such replication is performed, resulting in differing encryptions for the replicated application labels. In some aspects, the number of replicated application labels may be an integer power of two, such as 256. Because these application labels are encrypted, the data processor may not know the result of the application at this stage, that is, whether the application is to be accepted or declined.

After generating the plurality of application labels, a randomly selected portion of these application labels may be inverted. In other words, for each application label of this portion, a "True" response is inverted to become a "False" response, or a binary 1 may be flipped to become a binary 0, or, for responses having values of 1 or −1, a 1 may be inverted to become a −1, or vice versa. In some implementations each application label may have a 50% chance to be inverted. The data processor maintains a record of which application labels are inverted, for example by maintaining a record of the indices of the application labels which have been inverted. Thus, without knowing these indices, an observer will not know the response to the application, as roughly half of the application labels in the plurality of application labels indicate a positive response, while a roughly equal proportion may indicate a negative response.

In addition to randomly inverting application labels of the plurality of application labels, in some aspects, a plurality of padding labels may also be generated. Such padding labels may be randomly generated and may not be related to the application response. For example, the padding labels may be pseudorandomly generated to have a value equally likely to be positive or negative. In some aspects, the number of padding labels may be equal to the number of application labels in the plurality of application labels. The data processor may maintain a record of the values of each of the padding labels.

The data processor may generate a shuffled list including the plurality of application labels, including the inverted application labels, and the plurality of padding labels. The data processor may maintain a record of which labels in the shuffled list correspond to application labels, and which correspond to padding labels. Thus, an outside observer, not knowing these indices, will not know whether any particular label in the shuffled list is an uninverted or inverted application label reflecting an encrypted application response or a padding label having a value unrelated to the application response.

The shuffled list of labels may then be provided to the client who submitted the application, requesting the client to decrypt the labels in the shuffled list of labels, in accordance with the FHE algorithm, and return the decrypted labels to the data processor.

Upon receipt of the decrypted list, the data processor may perform a validation of the decrypted list. For example, the data processor may identify the indices in the decrypted list corresponding to inverted application labels, and invert them back, resulting in uninverted application labels. The data processor may then examine each application label in the decrypted list, based on the stored indices of the application labels, and verify their integrity. That is, when the application labels have not been altered, they should all have the same value, and so the integrity of the application labels may be verified when all of the application labels are "True" or all are "False" (or all are 1, 0, or −1, depending on how the application labels are represented).

When padding labels are included in the shuffled list, validation may further include verifying that the padding labels are preserved as generated. That is, validation may include verifying that each padding label has the correct value and is present at the proper indices within the shuffled list.

In response to successfully validating the decrypted list, the client may be provided with an unobfuscated response to their application. That is, the client may be provided with a clear indication of whether the application is accepted or denied.

Consider a simple example, where the plurality of application labels include only 4 replications, rather than 256. Further, let the application labels be either T for True, or F for False, to indicate approval or denial. Assume the application was approved, and the plurality of application labels includes TTTT. Randomly inverting application labels in this plurality of application labels may result in TFTT, that is, three of the application labels may not be inverted (indices 1, 2, and 4), while the application label at index 3 is inverted. Generation of padding labels may result in a shuffled list represented as TFFTTTFF, where bits 1, 2, 5, and 6 are the application labels, while bits 3, 4, 7, and 8 are the padding labels. This shuffled list is sent to the client for decryption. The client does not know which bits are the application labels and which are mere padding, and validation will detect any changes the client makes. The client has a very low chance, even with only 4 application labels, of correctly altering the application labels without being detected. For example, if the client tries to guess where the 4 application labels are and to swap their position, there may be 8 choose 4, or 70 potential positions for the 4 application labels. The client thus has quite low odds of successful alteration of the results, and such chances diminish exponentially as the number of application labels increases. Upon the client decrypting and returning the shuffled list, the data processor validates by verifying that the padded bits are unaltered, and that all application bits (after uninverting the flipped bit) match. Upon successful validation, the data processor sends the client an application label which the client may decrypt and identify that the application was approved.

While the above examples describe validation of application responses corresponding to a single binary application label, for applications which may either be approved or declined, the example implementations may be extended to validate application responses which may be expressed as a plurality of bits. For example, a response to an application may be expressed as a plurality of bits, such as a score associated with the application. For each bit in the response, the above techniques may be used to validate that bit. For example, in a two bit application response, a result may be 00, 01, 10, or 11. Validating a response to such an application may include two stages. First, this process may include generating a plurality of first application labels corresponding to the first bit of the application response, randomly inverting a portion of the first application labels, generating a first shuffled list corresponding to this plurality of first application labels, requesting the client decrypt the first shuffled list, and validating the first shuffled list as described above. The process may then be repeated by generating a plurality of second application labels corresponding to the second bit of the application response, randomly inverting a portion of the second application labels, generating a second shuffled list corresponding to this plurality of second application labels, requesting the client decrypt the second shuffled list, and validating the decrypted second shuffled list as described above. The process may be repeated for each additional bit of the application response. If all bits of the application response are validated, the data processor may provide the user with a single copy of the application label, which the client may decrypt to obtain the application response.

Figure 3:
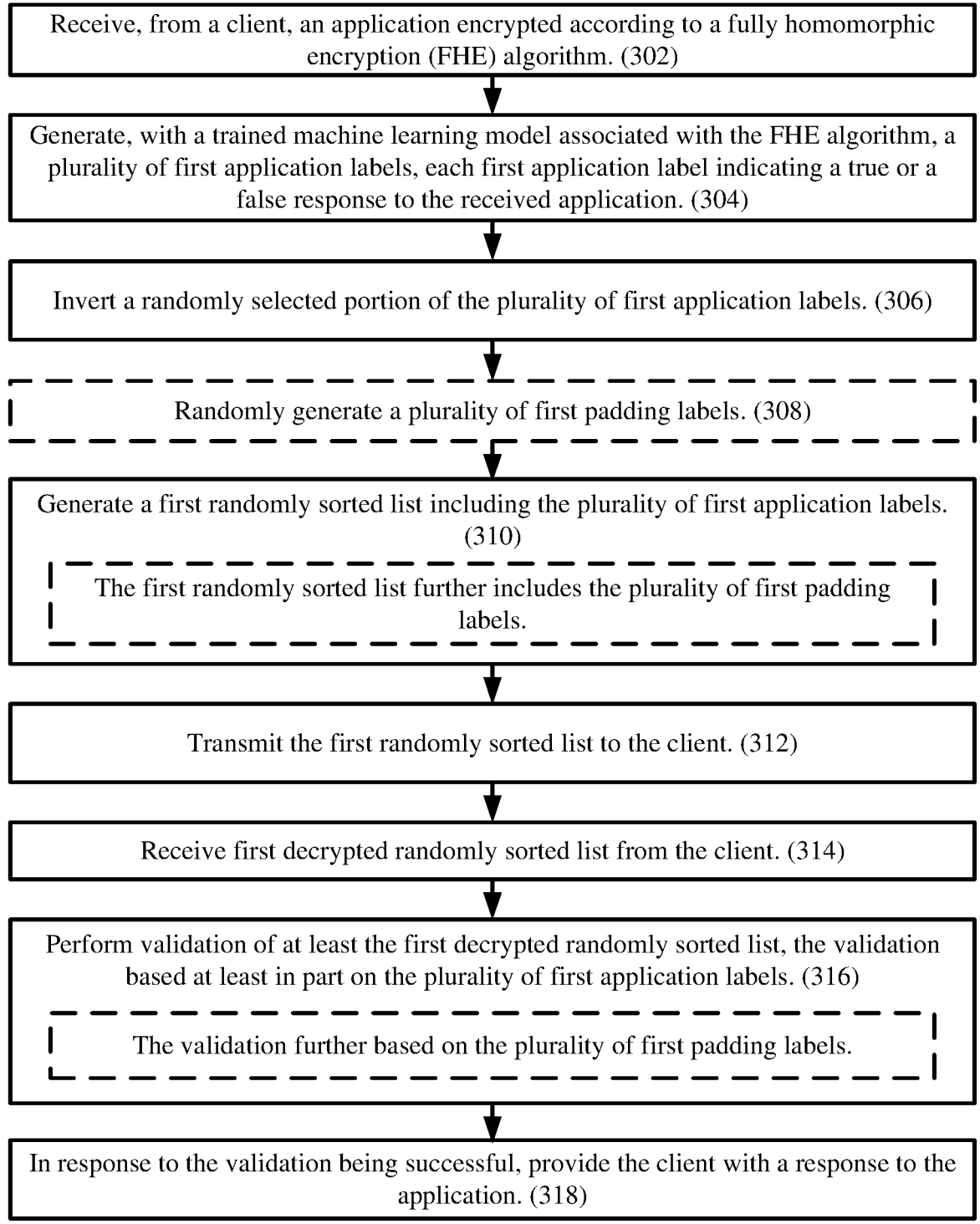
FIG. 3 shows an illustrative flow chart depicting an example operation for securely verifying integrity of application responses, according to some implementations.

FIG. 3 shows an illustrative flow chart depicting an example operation 300 for securely verifying integrity of application responses, according to some implementations. The example operation 300 may be performed by one or more processors of a computing device associated with a machine learning model. In some implementations, the example operation 300 may be performed using the secure application validation system 100 of FIG. 1. It is to be understood that the example operation 300 may be performed by any suitable systems, computers, or servers.

At block 302, the secure application validation system 100 receives, from a client, an application encrypted in accordance with a fully homomorphic encryption (FHE) algorithm. At block 304, the secure application validation system 100 generates, with a trained machine learning model associated with the FHE algorithm, a plurality of first application labels, each first application label indicating a true or false response associated with the received application. At block 306, the secure application validation system 100 inverts a randomly selected portion of the plurality of first application labels. Optionally, at block 308, the secure application validation system 100 randomly generates a plurality of first padding labels. At block 310, the secure application validation system 100 generates a first randomly sorted list including the plurality of first application labels. At block 312, the secure application validation system 100 transmits the first randomly sorted list to the client. At block 314, the secure application validation system 100 receives a first decrypted randomly sorted list from the client. At block 316, the secure application validation system 100 performs a validation of at least the first decrypted randomly sorted list, where the validation is based at least in part on the plurality of first application labels. At block 318, the secure application validation system 100 provides the client with a response to the application in response to the validation being successful.

In some implementations, the first randomly sorted list generated in block 310 further includes the plurality of first padding bits, and the validation performed in block 316 is further based on the plurality of first padding bits. In some aspects, a number of first application labels in the plurality of first application labels equals a number of first padding labels in the plurality of first padding labels. In some aspects, the plurality of first application labels includes an integer power of two first application labels and the plurality of first padding labels each include the integer power of two first padding labels.

In some implementations, inverting the randomly selected portion of the plurality of first application labels in block 306 includes inverting randomly inverting first application labels such that each application label of the plurality of first application labels has a 50% chance to be inverted.

In some implementations, performing the validation of the first decrypted randomly sorted list in block 316 includes verifying that all first application labels are true or that all first application labels are false. In some aspects, performing the validation of the first decrypted randomly sorted list in block 316 includes verifying that each first padding label has an index and a value in correspondence with the randomly sorted list.

In some implementations, the trained machine learning model includes one of a decision tree, a random forest, or a logistic regression model.

In some aspects, the operation 300 further includes generating, with the trained machine learning model associated with the FHE algorithm, a plurality of second application labels, each second application label indicating a true or false response associated with the received application, inverting a randomly selected portion of the plurality of second application labels, randomly generating a plurality of second padding labels, generating a second randomly sorted list including the plurality of second application labels and the plurality of second padding labels, providing the second randomly sorted list to the client, and receiving a second decrypted randomly sorted list from the client, wherein the validation further validates the second decrypted randomly sorted list, wherein the validation is further based at least in part on the plurality of second application labels and the plurality of second padding labels.

As used herein, a phrase referring to "at least one of" a list of items refers to any combination of those items, including single members. As an example, "at least one of: a, b, or c" is intended to cover: a, b, c, a-b, a-c, b-c, and a-b-c.

Figure 4:
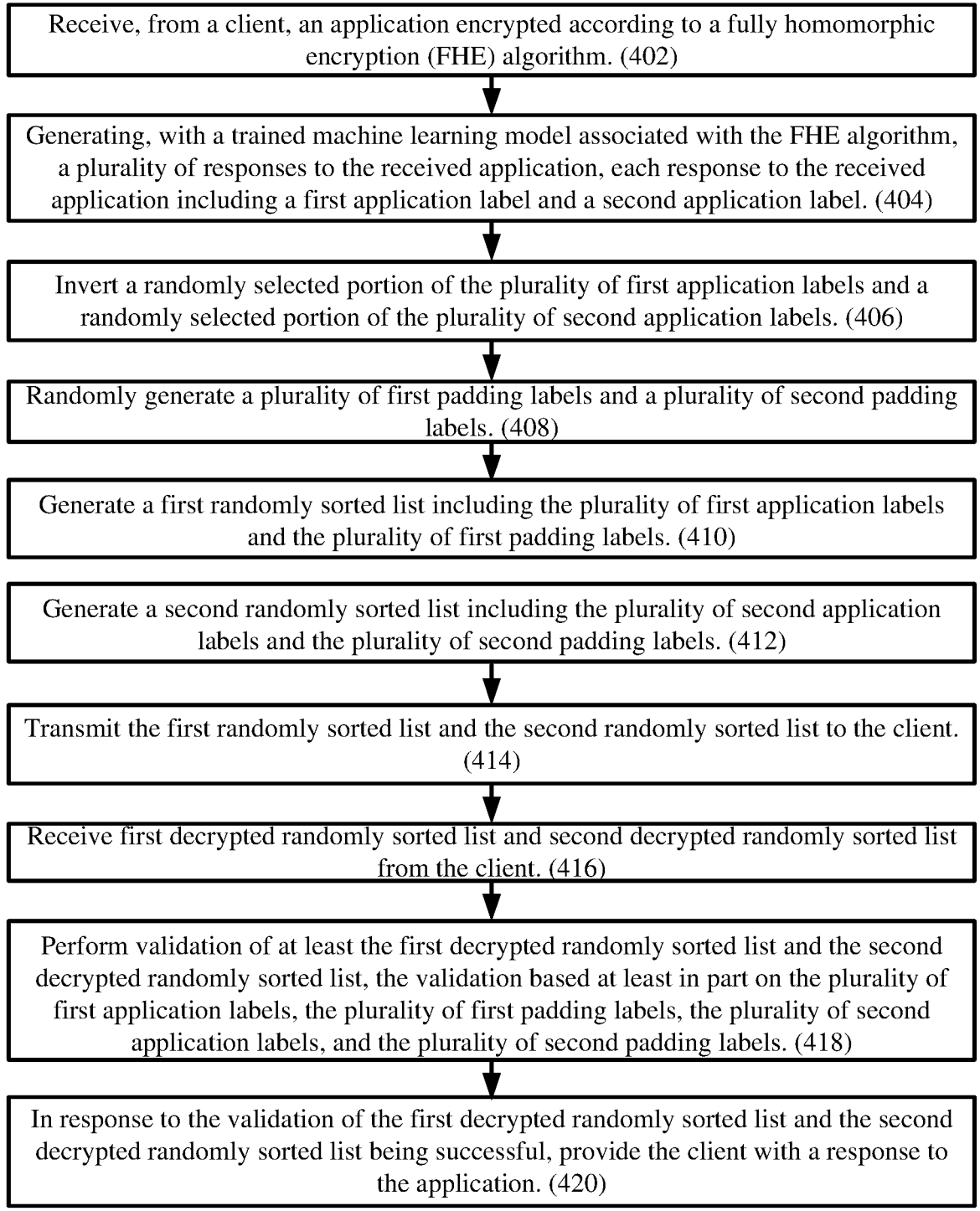
FIG. 4 shows an illustrative flow chart depicting an example operation for securely verifying integrity of application responses, according to some implementations.

FIG. 4 shows an illustrative flow chart depicting an example operation 400 for securely verifying integrity of application responses, according to some implementations. The example operation 400 may be performed by one or more processors of a computing device associated with a machine learning model. In some implementations, the example operation 400 may be performed using the secure application validation system 100 of FIG. 1. It is to be understood that the example operation 400 may be performed by any suitable systems, computers, or servers.

At block 402, the secure application validation system 100 receives, from a client, an application encrypted in accordance with a fully homomorphic encryption (FHE) algorithm. At block 404, the secure application validation system 100 generates, with a trained machine learning model associated with the FHE algorithm, a plurality of responses to the received application, where each response to the received application includes a first application label and a second application label. At block 406, the secure application validation system 100 inverts a randomly selected portion of the plurality of first application labels and the plurality of second application labels. At block 408, the secure application validation system 100 randomly generates a plurality of first padding labels and a plurality of second padding labels. At block 410, the secure application validation system 100 generates a first randomly sorted list including the plurality of first application labels and the plurality of first padding labels. At block 412, the secure application validation system 100 generates a second randomly sorted list including the plurality of second application labels and the plurality of second padding labels. At block 414, the secure application validation system 100 transmits the first randomly sorted list and the second randomly sorted list to the client. At block 416, the secure application validation system 100 receives a first decrypted randomly sorted list and a second decrypted randomly sorted list from the client. At block 418, the secure application validation system 100 performs a validation of at least the first decrypted randomly sorted list and the second decrypted randomly sorted list, the validation based at least in part on the plurality of first application labels, the plurality of first padding labels, the plurality of second application labels, and the plurality of second padding labels. At block 420, the secure application validation system 100 provides the client with a response to the application in response to the validation of the first decrypted randomly sorted list and the second decrypted randomly sorted list being successful.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of securely verifying integrity of application responses, the method performed by one or more processors of a computing device and comprising:
   receiving, from a client, an application encrypted in accordance with a fully homomorphic encryption (FHE) algorithm;
   generating, with a trained machine learning model associated with the FHE algorithm, a plurality of first application labels, each first application label indicating a true or false response associated with the received application;
   inverting a randomly selected portion of the plurality of first application labels;
   generating a first randomly sorted list comprising the plurality of first application labels;
   transmitting the first randomly sorted list to the client
   receiving a first decrypted randomly sorted list from the client;
   performing a validation of at least the first decrypted randomly sorted list, the validation based at least in part on the plurality of first application labels, wherein the validation is configured to detect tampering associated with the first decrypted randomly sorted list; and
   in response to the validation being successful, providing the client with a response to the application, the response corresponding to the true or the false response associated with the received application.

2. The method of claim 1, further comprising:
   randomly generating a plurality of first padding labels;
   wherein the first randomly sorted list further comprises the plurality of first padding labels; and
   wherein the validation is further based at least in part on the plurality of first padding labels.

3. The method of claim 2, wherein a number of first application labels in the plurality of first application labels equals a number of first padding labels in the plurality of first padding labels.

4. The method of claim 3, wherein the plurality of first application labels includes an integer power of two first application labels, and the plurality of first padding labels includes the integer power of two first padding labels.

5. The method of claim 2, wherein each application label of the plurality of first application labels has a 50% chance to be inverted.

6. The method of claim 2, wherein performing the validation of the first decrypted randomly sorted list comprises verifying that all first application labels are true or that all first application labels are false.

7. The method of claim 6, wherein performing the validation of the first decrypted randomly sorted list further comprises verifying that each first padding label has an index and a value in correspondence with the randomly sorted list.

8. The method of claim 2, wherein the trained machine learning model comprises one of a decision tree, a random forest, or a logistic regression model.

9. The method of claim 2, further comprising:
   generating, with the trained machine learning model associated with the FHE algorithm, a plurality of second application labels, each second application label indicating a true or false response associated with the received application;
   inverting a randomly selected portion of the plurality of second application labels;
   randomly generating a plurality of second padding labels;
   generating a second randomly sorted list comprising the plurality of second application labels and the plurality of second padding labels;
   providing the second randomly sorted list to the user; and
   receiving a second decrypted randomly sorted list from the client;
   wherein the validation further validates the second decrypted randomly sorted list, wherein the validation is further based at least in part on the plurality of second application labels and the plurality of second padding labels.

10. A system for securely verifying integrity of application responses, the system comprising:
one or more processors; and
a memory storing instructions that, when executed by the one or more processors, causes the system to perform operations including:
receiving, from a client, an application encrypted in accordance with a fully homomorphic encryption (FHE) algorithm;
generating, with a trained machine learning model associated with the FHE algorithm, a plurality of first application labels, each first application label indicating a true or false response associated with the received application;
inverting a randomly selected portion of the plurality of first application labels;
generating a first randomly sorted list comprising the plurality of first application labels;
transmitting the first randomly sorted list to the client;
receiving a first decrypted randomly sorted list from the user;
performing a validation of at least the first decrypted randomly sorted list, the validation based at least in part on the plurality of first application labels, wherein the validation is configured to detect tampering associated with the first decrypted randomly sorted list; and
in response to the validation being successful, providing the client with a response to the application, the response corresponding to the true or the false response associated with the received application.

11. The system of claim 10, wherein execution of the instructions causes the system to perform operations further comprising:
randomly generating a plurality of first padding labels;
wherein the first randomly sorted list further comprises the plurality of first padding labels; and
wherein the validation is further based at least in part on the plurality of first padding labels.

12. The system of claim 11, wherein a number of first application labels in the plurality of first application labels equals a number of first padding labels in the plurality of first padding labels.

13. The system of claim 12, wherein the plurality of first application labels includes an integer power of two first application labels, and the plurality of first padding labels includes the integer power of two first padding labels.

14. The system of claim 11, wherein each application label of the plurality of first application labels has a 50% chance to be inverted.

15. The system of claim 11, wherein execution of the instructions for performing the validation of the first decrypted randomly sorted list causes the system to perform operations further comprising verifying that all first application labels are true or that all first application labels are false.

16. The system of claim 15, wherein execution of the instructions for performing the validation of the first decrypted randomly sorted list causes the system to perform operations further comprising verifying that each first padding label has an index and a value in correspondence with the randomly sorted list.

17. The system of claim 11, wherein the trained machine learning model comprises one of a decision tree, a random forest, or a logistic regression model.

18. The system of claim 11, wherein execution of the instructions causes the system to perform operations further comprising:
generating, with the trained machine learning model associated with the FHE algorithm, a plurality of second application labels, each second application label indicating a true or false response associated with the received application;
inverting a randomly selected portion of the plurality of second application labels;
randomly generating a plurality of second padding labels;
generating a second randomly sorted list comprising the plurality of second application labels and the plurality of second padding labels;
transmitting the second randomly sorted list to the client; and
receiving a second decrypted randomly sorted list from the client;
wherein the validation further validates the second decrypted randomly sorted list, wherein the validation is further based at least in part on the plurality of second application labels and the plurality of second padding labels.

19. A method for securely verifying integrity of application responses, the method performed by one or more processors of a computing device and comprising:
receiving, from a client, an application encrypted in accordance with a fully homomorphic encryption (FHE) algorithm;
generating, with a trained machine learning model associated with the FHE algorithm, a plurality of responses to the received application, each response to the received application comprising a first application label and a second application label;
inverting a randomly selected portion of the plurality of first application labels and a randomly selected portion of the plurality of second application labels;
randomly generating a plurality of first padding labels and a plurality of second padding labels;
generating a first randomly sorted list comprising the plurality of first application labels and the plurality of first padding labels;
generating a second randomly sorted list comprising the plurality of second application labels and the plurality of second padding labels;
transmitting the first randomly sorted list and the second randomly sorted list to the client;
receiving a first decrypted randomly sorted list and a second randomly sorted list from the client;
performing a validation of at least the first decrypted randomly sorted list and the second decrypted randomly sorted list, the validation based at least in part on the plurality of first application labels, the plurality of first padding labels, the plurality of second application labels, and the plurality of second padding labels, wherein the validation is configured to detect tampering associated with the first decrypted randomly sorted list; and
in response to the validation of the first decrypted randomly sorted list and the second randomly sorted list being successful, providing the client with a response to the application, the response corresponding to the true or the false response associated with the received application.

20. The method of claim 19, wherein performing the validation of the first decrypted randomly sorted list comprises verifying that all first application labels are true or that all first application labels are false and wherein performing the validation of the second decrypted randomly sorted list comprises verifying that all second application labels are true or that all second application labels are false.

* * * * *